G. CHOATE.
STOVE-PIPE ELBOWS.
No. 193,847. Patented Aug. 7, 1877.
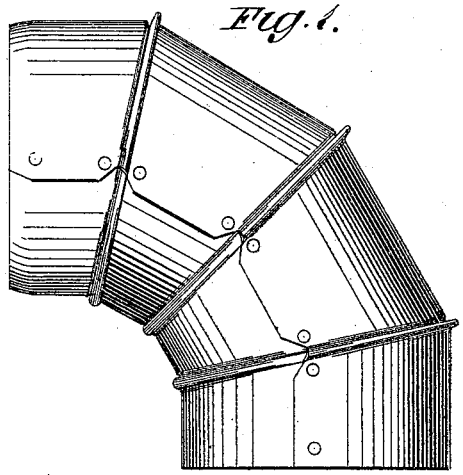
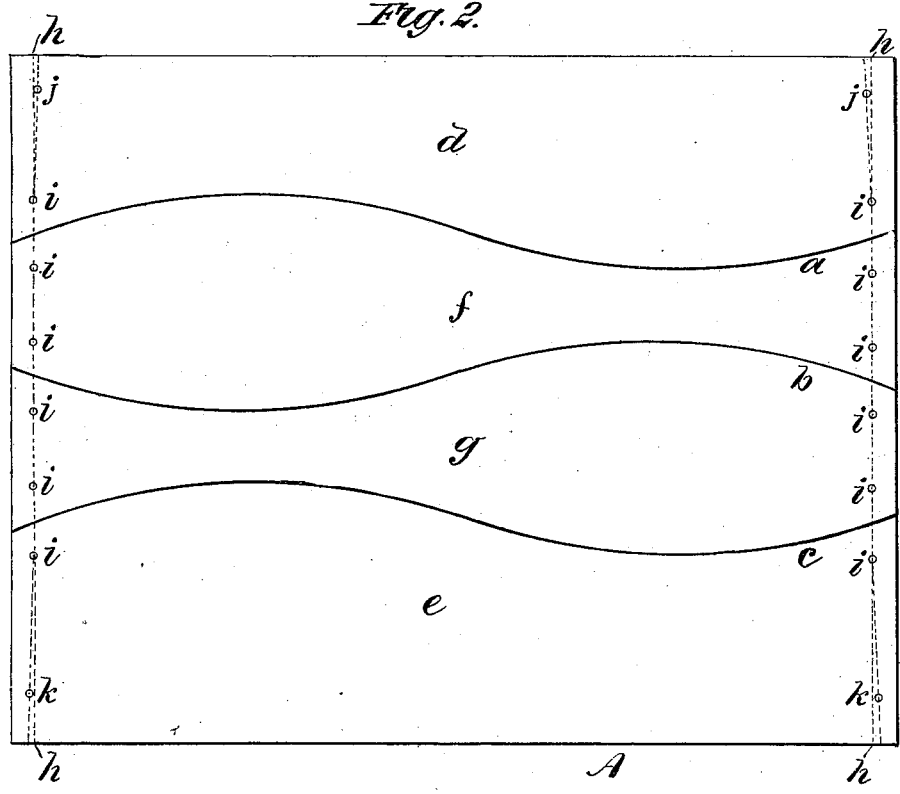

UNITED STATES PATENT OFFICE.

GREENE CHOATE, OF EAST SAGINAW, MICHIGAN.

IMPROVEMENT IN STOVE-PIPE ELBOWS.

Specification forming part of Letters Patent No. 193,847, dated August 7, 1877; application filed March 3, 1877.

*To all whom it may concern:*

Be it known that I, GREENE CHOATE, of East Saginaw, in the county of Saginaw and State of Michigan, have invented a new and Improved Stove-Pipe Elbow, of which the following is a specification:

Figure 1 is a side elevation of an elbow made from my improved blank. Fig. 2 represents the blank.

Similar letters of reference indicate corresponding parts.

The object of my invention is to cut the sections of which the elbow is composed from a rectangular piece of sheet metal without wasting material or incurring the labor of trimming the sections after they are cut from the sheet.

Another object of the invention is to place the seam of the elbow at the side of the same, instead of at the bottom, so as to prevent the pyroligneous acid or soot, which usually accumulates in stove-pipes, from exuding or oozing out, there being no seam at the bottom of the pipe for such a result to take place.

Blanks for the sections of four-piece elbows, as ordinarily cut, require trimming after being cut from the sheet, to give them the required curvature. The end sections of the elbow also require trimming, so that one end of the elbow shall be small enough to enter the pipe in which it is placed, and the other end of sufficient size to receive the small end of a length of pipe.

By my invention these difficulties are obviated.

Referring to the drawing, A is a sheet of metal that is cut on three similar but oppositely arranged curves, $a\ b\ c$. Each of these curves is composed of two arcs of equal radius. The sections cut upon these reversed curves require no trimming, but are ready to be at once formed into an elbow, as shown in Fig. 1. The sections $d\ e$ form the ends of the elbow, and the sections $f\ g$ form the central portion.

Upon the lines $h\ h$ holes $i\ i$ are made for receiving the rivets, by which the central portions of the elbow are secured together, and inside of the said lines in the section $d$ the holes $j$ are made for receiving a rivet that holds the smaller end of the elbow together, and outside of the lines $h$, in the section $e$, the holes $k$ are made for receiving the rivet that holds the larger end of the elbow together.

By cutting the blanks as above described, the seams in the elbow-sections are placed at the sides of the same, instead of at the bottom, thus preventing the pyroligneous acid from passing out.

I do not wish to claim, broadly, a four-part stove-pipe elbow, as they are in common public use. Hitherto such elbows have been made by making the blank thereof with a taper extending the whole length, which, when the blank is cut in two pieces, renders necessary the trimming of the ends, after the forming and riveting of the pipe-sections, before the latter can be put together.

By my invention I cut the blanks in such a manner as to make the proper difference in the ends of the elbow-sections, to allow one end to receive the other, this being done by making the taper half in each section only, thus avoiding all trimming and effecting a great saving of time.

Having thus described my invention, I claim as new and desire to secure by Letters Patent—

The stove-pipe elbow herein described, formed of a blank cut on three similar but oppositely-arranged reversed curves from a rectangular piece of metal, and formed with rivet-holes, for the purpose set forth, as shown in Fig. 2 of drawing.

GREENE CHOATE.

Witnesses:
    F. J. MOELLER,
    JOHN HUNGERFORD.